June 10, 1930. L. O. FRENCH 1,762,550
INTERNAL COMBUSTION ENGINE
Filed Dec. 10, 1925
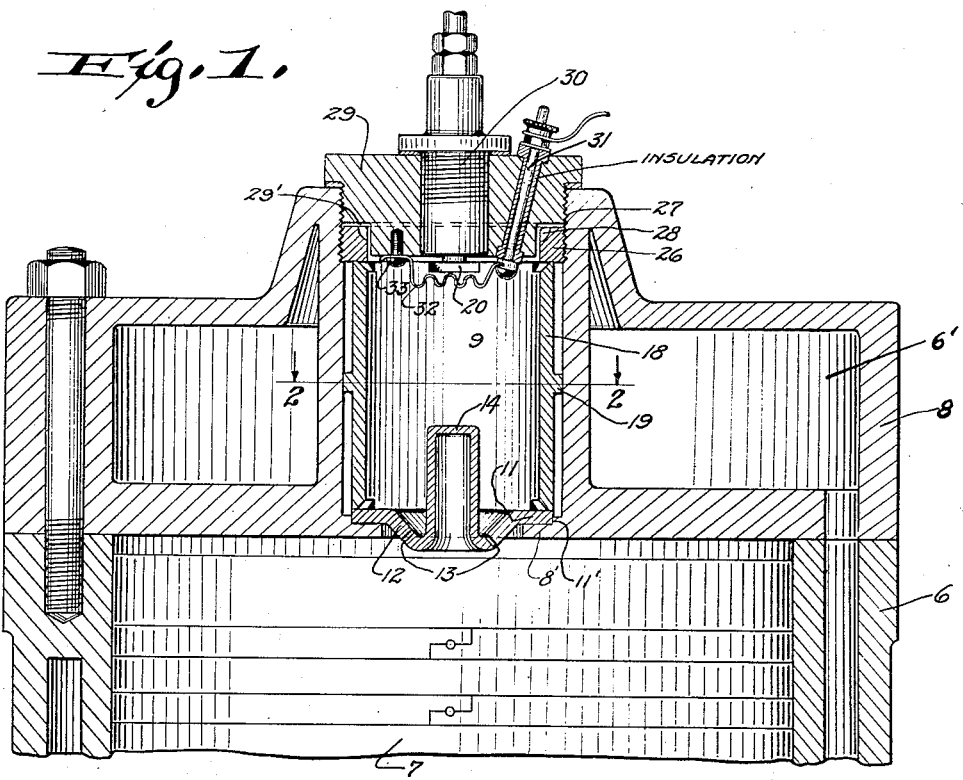
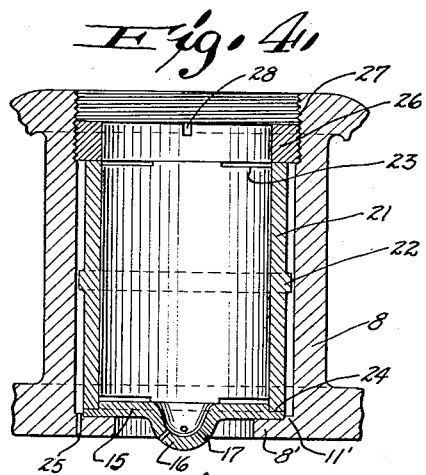
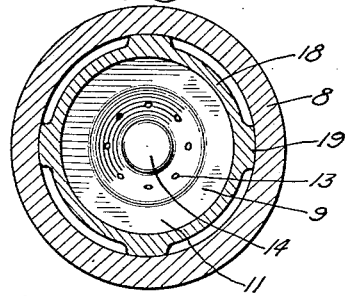
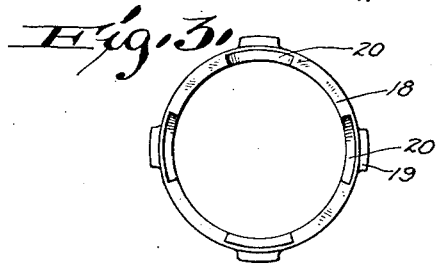
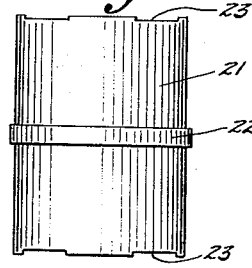
INVENTOR.
Louis O. French Patented June 10, 1930

1,762,550

UNITED STATES PATENT OFFICE

LOUIS O. FRENCH, OF MILWAUKEE, WISCONSIN

INTERNAL-COMBUSTION ENGINE

Application filed December 10, 1925. Serial No. 74,532.

The invention relates to internal combustion engines, and more particularly to those using liquid fuel and of the gas injection type.

Gas injection type engines, wherein the fuel is injected into a precombustion chamber in restricted communication with the cylinder or main combustion chamber, usually employ high compression pressures. Where such engines use medium or low compression pressures, I find that when some of the fuel strikes the relatively cool walls of the precombustion chamber, it carbonizes, and this tendency is emphasized by the fact that in engines of the smaller sizes the air in said chamber is subjected to a greater cooling effect than in the cylinder and this probably accounts for the fact that in some engines using high compressions a hot plug is used for starting. In order to overcome these difficulties, one of the objects of this invention is to provide a hot surface liner for the precombustion chamber which has relatively poor heat conductive contact with the cooled head and whose ends also have poor thermal contact with the cooled parts of the head so that the liner may be kept at a temperature well above the ignition point of the fuel without, however, subjecting it to a destructively high temperature, with the result that the fuel is efficiently vaporized and burned in the engine.

A further object of the invention is to provide a construction in which the hot liner and the apertured partition between the precombustion chamber and the main combustion chamber may be readily removed without taking off the cylinder head.

A further object of the invention is to provide a construction in which the hot liner is associated with an apertured partition between the combustion chambers of a form to insure quick starting and efficient ignition of the charge in the main combustion chamber of an internal combustion engine using medium compression pressures or pressures insufficient to cause auto-ignition when starting from cold.

The invention further consists in the several features hereinafter set forth and more particularly defined by claim at the conclusion hereof.

In the drawings, Fig. 1 is a detail sectional view through an engine embodying the invention;

Fig. 2 is a detail sectional view taken on the line 2—2 of Fig. 1;

Fig. 3 is an end view of the liner;

Fig. 4 is a detail sectional view showing certain modifications of parts shown in Fig. 1;

Fig. 5 is a side elevation view of the liner shown in Fig. 4.

In the drawings the numeral 6 designates the cylinder of the engine, 7 the piston working therein, and 8 the cylinder head, having a cooling space 6'.

The combustion chamber is divided into a precombustion or vaporizing chamber 9 and the main combustion chamber 10, as shown in Fig. 1, by means of an apertured partition 11 provided with an annular depending portion 12 having one or more openings 13 therein affording restricted communication between said chambers and having a hot surface portion in the form of a hot tube projection 14 extending up into the chamber 9 and opening into the chamber 10, and, as shown in Fig. 4, by means of an apertured partition 15 provided with a depending projection 16 having one or more openings 17 affording restricted communication between said chambers. In each instance the partition 11 or 15 is centered in the head by seating in a recess 11' in a flange 8' on the head.

While the partitions 11 or 15 may be secured to the head 8 in any suitable manner, I prefer to clamp them in place in each instance by the hot liner for the precombustion chamber so that the removal of the liner frees the partition from the head so that it may be lifted out from the outer end of said chamber.

The hot liner 18, shown in Figs. 1 to 3, inclusive, is of a form conforming to the shape of the precombustion chamber so that it may be removed therefrom from the outer end of said chamber, and is shown as tubular. This liner has a plurality of spaced centering projections 19, preferably arranged at a medial part of the tube, which have a loose contact with the side wall of chamber 9. The function of these projections, in addition to centering the tube, is to provide strength at the central portion of the tube to prevent is buckling, and to permit of some heat conduction from the central portion of the tube to the cooled head to prevent excessive heating. To provide relatively poor thermal contact between the ends of this liner and the parts which it engages, portions 20 of said ends are recessed or bevelled. It will, of course, be understood that the projections 19 and the portions 20 may be provided upon the parts with which the liner contacts, but, from the production standpoint, it is better to have these features in the liner.

The hot liner 21, shown in Figs. 4 and 5, consists of a tubular member having a medially disposed flange 22 and recesses 23 formed in the ends thereof whose depth is exaggerated in the drawing for the purpose of illustration, as the actual depth need only be a few thousands of an inch to prevent actual contact with the adjacent parts. The flange 22 strengthens the tube 21 and when cold its outer edge is spaced slightly away from the cooled walls of the precombustion chamber, but as it becomes heated it expands into closer relation with or into contact with the cooled wall so that the temperature of the liner may be automatically controlled. In this instance the liner 21 is centered by seating in a recess 24 in the partition 15. A small opening 25 in the head may be provided for communication between the main combustion chamber and the space between the main body of the liner and the cooled wall of the chamber to provide some circulation and permit heating the outside of the liner by gases from the main combustion chamber. It will, of course, be understood that recesses similar to the recesses 23 may be provided in the ends of the liner 18 instead of the bevelled portions 20.

In each instance a clamping ring 26 has threaded engagement with the threaded end 27 of the precombustion chamber. This ring has diametrically disposed slots 28 for receiving a suitable tool to turn it so that it may exert a clamping pressure on the liner, which in turn forces the partition 11 or 15 into tight contact with the inwardly extending flange 8' on the cooled cylinder head. This contact between the partition and the head serves to keep the partition from overheating, while the contact of the tube at one end with this partition and the ring 26 at the other provides relatively poor thermal conductivity between the liner and the cooled walls of the head and thus allows it to remain at the desired temperature throughout its length, the poor thermal contact at the upper end of the liner being especially important as the fuel spray does not come into contact with or have a chance to pass through as much heated air at this part as that portion of the spray which reaches the lower end of the chamber 9.

The top of the precombustion chamber 9 is closed off by a cap or cover 29 which has threaded engagement with the threaded end 27 of said chamber and carries a fuel injector or spray nozzle 30 of any suitable construction, but preferably one which will produce a fine spray. As the cover 29 engages the cooled head the nozzle does not have to have any special cooling means. The plug 29 preferably has an annular recess 29' within which the ring 26 is disposed.

For starting purposes an electrode 31, suitably insulated from the cover 29, extends therethrough and has an electrically-heated resistance or hot wire element 32 secured thereto at one end and grounded to the cover at its other end by a screw 33. This element 32 is preferably so positioned as to be out of the path of the main spray issuing from the injector and in the region of the fuel mist given off by the spray as it issues from the injector, which I find produces a very efficient starting with a small expenditure of electrical energy and conserves the life of the element 32.

With the above construction, assuming that the engine has become heated by initial use of the electrically-heated starting plug during the first few revolutions of the engine, then with either two or four cycle operation, on the compression stroke the air is compressed in the cylinder and in the chamber 9, and near the end of the compression stroke fuel is injected into the chamber 9 by the injector 30, supplied with fuel in proper timed relation with the operation of the engine, and this fuel strikes the hot walls of the liner and the partition and becomes wholly or partly vaporized or gasified, the pressure thus generated causing the fuel charge to be expelled from said chamber into the main combustion chamber where it mixes with the air therein and is burned, the gases expanding and doing work on the piston during the ensuing power stroke. Where the partition has a hot tube portion 14 some of the gases passing into the main combustion chamber enter said tube and are expelled thereby in a flaming stream into the gases in said chamber.

The liner 18 is mounted loosely enough in the precombustion chamber 9 so that it can be readily removed upon the removal of the ring 26, but as said liner expands the projections 19, which are normally in contact with the cooled walls of the head, make better contact therewith and thus prevent excessive heating of the tube. In a similar manner the connection between the liners 18 or 21 at their ends with parts cooled by the head prevent excessive heating. The flange 22 is normally out of contact with the cooled walls of the head but upon expansion moves closer to or may come into contact with said cooled walls. Thus the thickness of the walls of the liner may be such as to prevent ready rupture under heat, in continued service, and yet the temperatures thereof may be maintained at a point to efficiently handle the liquid fuel.

It will be noted that the main body portion of the liner is spaced only a short distance from the cooled walls of the head and this enables the gases, cooled by said head, to exert some cooling influence upon the liner and thus aid in preventing its deterioration under the heat to which it is subjected.

The partitions are preferably made of heat-resistant materials, such as nickel-steel or chrome-nickel compositions, such as nichrome or chromel, and the liners are of the same materials, or made of a good grade of cast iron.

While I have described the beginning of the injection occurring as near the end of the compression stroke, it will be understood that the injection may begin earlier in said stroke or, in case of a four cycle engine, may begin during the suction stroke if the speed of the engine is high and hence the time for vaporization of the fuel relatively short. In other words, in engines of this type the injection is timed to get the fuel into the cylinder sufficiently early to vaporize it, in whole or in part, before the power stroke but yet not so early as to cause preignition in the main combustion chamber during the compression stroke.

I desire it to be understood that this invention is not to be limited to any particular form or arrangement of parts except in so far as such limitations are specified in the claim or necessitated by the prior art.

What I claim as my invention is:

In an internal combustion engine, the combination with the main combustion chamber, of a cooled cylinder head having a precombustion chamber, a removable, apertured partition between said chambers contacting at its peripheral portion with said head, a removable liner of said precombustion chamber out of contact with said head and contacting at its inner end with said partition, a clamping member in contact with said head engaging the upper end of said liner, the contact area of the ends of said liner with said partition and clamping member being less than the average cross-sectional area of said liner so that said ends are in relatively poor thermal conductive relation with the cooled head to maintain said liner in a hot condition while the engine is running.

In testimony whereof, I affix my signature.

LOUIS O. FRENCH.

CERTIFICATE OF CORRECTION.

Patent No. 1,762,550.                         Granted June 10, 1930, to

LOUIS O. FRENCH.

It is hereby certified that error appears in the printed specification of the above numbered patent requiring correction as follows: Page 3, line 55, in the claim, after the word "portion" insert the word only; line 56; for the word "of" read for, and line 58, after the word "with" insert the words the peripheral portion of; and that the said Letters Patent should be read with these corrections therein that the same may conform to the record of the case in the Patent Office.

Signed and sealed this 9th day of September, A. D. 1930.

(Seal)                                                M. J. Moore,
                                                         Acting Commissioner of Patents.